United States Patent
Murray et al.

(10) Patent No.: US 11,684,004 B2
(45) Date of Patent: Jun. 27, 2023

(54) SYSTEM AND METHOD FOR SUGGESTING AN OPTIMAL TIME FOR PERFORMING AN AGRICULTURAL OPERATION

(71) Applicant: DEERE & COMPANY, Moline, IL (US)

(72) Inventors: Cole L. Murray, Polk City, IA (US); Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 232 days.

(21) Appl. No.: 16/588,096

(22) Filed: Sep. 30, 2019

(65) Prior Publication Data
US 2021/0092895 A1 Apr. 1, 2021

(51) Int. Cl.
| | |
|---|---|
| *A01B 79/00* | (2006.01) |
| *A01D 91/02* | (2006.01) |
| *A01G 22/00* | (2018.01) |
| *G01W 1/10* | (2006.01) |
| *G06V 20/10* | (2022.01) |

(52) U.S. Cl.
CPC ............ *A01B 79/005* (2013.01); *A01D 91/02* (2013.01); *A01G 22/00* (2018.02); *G01W 1/10* (2013.01); *G06V 20/188* (2022.01)

(58) Field of Classification Search
CPC ...... A01B 79/005; A01D 91/02; A01G 22/00; G01W 1/10; G06K 9/00657; G06Q 10/0631; G06Q 50/02; G06Q 10/06; G06Q 50/01; G06Q 10/0639; G06N 20/00
USPC ............. 340/540; 701/50, 469; 702/1–2, 19, 702/188–189
See application file for complete search history.

(56) References Cited

U.S. PATENT DOCUMENTS

| | | | | |
|---|---|---|---|---|
| 9,076,118 | B1 * | 7/2015 | Mewes | G06Q 10/067 |
| 9,140,824 | B1 * | 9/2015 | Mewes | A01B 79/005 |
| 9,563,852 | B1 * | 2/2017 | Wiles | G06Q 10/04 |
| 10,255,670 | B1 * | 4/2019 | Wu | H04N 7/183 |
| 10,721,859 | B2 * | 7/2020 | Wu | G06T 7/73 |
| 2016/0026940 | A1 * | 1/2016 | Johnson | A01B 79/005 705/7.11 |
| 2016/0078375 | A1 | 3/2016 | Ethington et al. | |

(Continued)

FOREIGN PATENT DOCUMENTS

WO WO2019033055 A1 2/2019

OTHER PUBLICATIONS

European Search Report issued in counterpart application No. 20198740.1 dated Mar. 4, 2021 (11 pages).

*Primary Examiner* — Jeffrey P Aiello
(74) *Attorney, Agent, or Firm* — Tucker Ellis LLP

(57) ABSTRACT

A method of generating a suggested optimal time for performing an agricultural operation in a field includes receiving data related to a current condition of a crop in the field. A predicted optimal time to perform the agricultural operation in the field is calculated using an agricultural model. Crowdsourcing data is received related to agricultural operations occurring within a defined area surrounding the field and within a defined preceding time period. The predicted optimal time to perform the agricultural operation is adjusted based on the crowdsourcing data, to generate the suggested optimal time to perform the agricultural operation. The suggested optimal time is communicated to a communicator located remote from the computing device and then displayed on the communicator.

18 Claims, 2 Drawing Sheets

(56) References Cited

U.S. PATENT DOCUMENTS

| | | |
|---|---|---|
| 2016/0308954 A1 | 10/2016 | Wilbur et al. |
| 2017/0086381 A1 | 3/2017 | Roell et al. |
| 2018/0121821 A1 | 5/2018 | Parsons et al. |
| 2018/0189745 A1* | 7/2018 | Fleming .............. G06Q 10/1097 |
| 2018/0315135 A1* | 11/2018 | Sarangi .................. G06Q 50/02 |
| 2020/0273172 A1* | 8/2020 | Weldemariam .......... G06N 3/08 |
| 2020/0296906 A1* | 9/2020 | Sun ........................ G06Q 50/02 |

* cited by examiner

SYSTEM AND METHOD FOR SUGGESTING AN OPTIMAL TIME FOR PERFORMING AN AGRICULTURAL OPERATION

TECHNICAL FIELD

The disclosure generally relates to a method and a system for suggesting an optimal time for performing an agricultural operation in a field.

BACKGROUND

Many agricultural operations are time and/or weather dependent. For example, the baling of hay generally requires that the hay be dried to a certain moisture content before baling. In order for the hay to dry-down to the desired moisture content in as short of time as possible, it is desirable that the hay be cut at a time likely to be followed by a period of dry weather. Additionally, humidity levels of the air and air temperatures may result in dew forming on the cut hay in the morning, making it desirable to bale the hay only after the dew has dried off and/or evaporated.

Agricultural models exist that consider various different inputs and calculate a predicted optimal time to perform the different agricultural operations, e.g., mowing or baling hay. These models may consider current weather data, current crop data, historical trends, weather forecasts, etc. however, these models do not always accurately reflect the current conditions of the crop. For example, an inaccurate weather forecast may predict rain, causing the model to suggest baling hay at a later date and/or time, when current conditions provide a satisfactory period for baling hay.

SUMMARY

A method of generating a suggested optimal time for performing an agricultural operation in a field is provided. The method includes providing a computing device at a location remote from the field. The computing device includes a processor and a memory having a time estimator algorithm stored thereon. The processor is operable to execute the time estimator algorithm to perform the steps of the method. The method includes receiving data with the time estimator algorithm of the computing device. The data is related to a current condition of a crop in the field. A predicted optimal time to perform the agricultural operation in the field is calculated with the time estimator algorithm of the computing device, using an agricultural model. The agricultural model calculates the predicted optimal time using the data related to the current condition of the crop as an input. Crowdsourcing data is received with the time estimator algorithm of the computing device. The crowdsourcing data is related to agricultural operations occurring within a defined area surrounding the field and within a defined preceding time period. The predicted optimal time to perform the agricultural operation calculated by the agricultural model is adjusted with the time estimator algorithm of the computing device, based on the crowdsourcing data, to generate the suggested optimal time to perform the agricultural operation. The suggested optimal time is communicated to a communicator located remote from the computing device with the time estimator algorithm of the computing device, and then displayed on the communicator.

In one aspect of the disclosure, the agricultural operation may include, but is not limited to, one of mowing the crop, raking the crop, baling the crop, spraying the crop, fertilizing the crop, irrigating the crop, or applying a pesticide to the crop.

In one aspect of the disclosure, the step of receiving data related to the current condition of the crop in the field includes receiving data from at least one sensor located in the field. The data from the at least one sensor may include, but is not limited to, data related to at least one of a current air temperature in the field, a current soil moisture content in the field, a current humidity in the field, a current wind speed in the field, or a current barometric pressure in the field.

In another aspect of the disclosure, the step of receiving data related to the current condition of the crop in the field includes receiving data from an aerial imager. The data from the aerial imager may include, for example, an overhead image of the crop in the field.

In one aspect of the disclosure, the time estimator algorithm of the computing device receives data that is related to a forecast for the field. The time estimator algorithm may receive the data related to the forecast for the field from at least one website via an internet connection. The data related to the forecast for the field may include, but is not limited to, data related to at least one of a weather forecast for the field for a predefined future time period, a solar forecast for the field for the predefined future time period, a wind forecast for the field for the predefined future time period, a humidity forecast for the field for the predefined future time period, or a precipitation forecast for the field for the predefined future time period.

In one aspect of the disclosure, the crowdsourcing data related to the agricultural operations within the defined area surrounding the field and within the defined preceding time period may include, but is not limited to, data related to at least one of a crop baling operation occurring within the defined area, a crop mowing operation occurring within the defined area, a crop raking operation occurring within the defined area, a crop spraying operation occurring within the defined area, a crop fertilizing operation occurring within the defined area, a crop pesticide application occurring within the defined area, a crop irrigation operation occurring within the defined area, an equipment moving operation occurring within the defined area, or traffic data on roadways within the predefined area.

In one aspect of the disclosure, the communicator may include, but is not limited to, a portable handheld device, a laptop computer, a desktop computer, a tablet, a computer, or some other electronic device capable of receiving data via the internet and communicating the data to an operator.

A system for generating a suggested optimal time for performing an agricultural operation in a field is also provided. The system includes a communicator operable to convey the suggested optimal time, and a computing device disposed in communication with the communicator and located remote from the field and the communicator. The computing device includes a processor and a memory having a time estimator algorithm stored thereon. The processor is operable to execute the time estimator algorithm to receive data related to a current condition of a crop in the field, and calculate a predicted optimal time to perform the agricultural operation in the field with an agricultural model. The Agricultural model uses the received data related to the current condition of the crop as an input. The time estimator algorithm receives crowdsourcing data related to agricultural operations occurring within a defined area surrounding the field and within a defined preceding time period, and adjusts the predicted optimal time to perform the agricultural operation calculated by the agricultural model based on the received crowdsourcing data, to generate the suggested optimal time to perform the agricultural operation. The suggested optimal time is then communicated to the communicator.

In one aspect of the disclosed system, the agricultural operation may include one of mowing the crop, raking the crop, baling the crop, spraying the crop, fertilizing the crop, irrigating the crop, or applying a pesticide to the crop.

In one aspect of the disclosed system, the processor is operable to execute the time estimator algorithm to receive data from at least one sensor located in the field. The data from the at least one sensor may include data related to at least one of a current air temperature in the field, a current soil moisture content in the field, a current humidity in the field, a current wind speed in the field, or a current barometric pressure in the field.

In another aspect of the disclosed system, the processor is operable to execute the time estimator algorithm to receive data from at least one website via an internet connection. The data from the at least one website may include, but is not limited to, data related to at least one of a weather forecast for the field for a predefined future time period, a solar forecast for the field for the predefined future time period, a wind forecast for the field for the predefined future time period, a humidity forecast for the field for the predefined future time period, or a precipitation forecast for the field for the predefined future time period.

In one aspect of the disclosed system, the crowdsourcing data related to the agricultural operations may include, but is not limited to, data related to at least one of a crop baling operation occurring within the defined area, a crop mowing operation occurring within the defined area, a crop raking operation occurring within the defined area, a crop spraying operation occurring within the defined area, a crop fertilizing operation occurring within the defined area, a crop pesticide application occurring within the defined area, a crop irrigation operation occurring within the defined area, an equipment moving operation occurring within the defined area, or traffic data on roadways within the predefined area.

In one aspect of the disclosed system, the processor is operable to execute the time estimator algorithm to receive data from an aerial imager. The data from the aerial imager may include, but is not limited to, an overhead image of the crop in the field. The aerial imager may include, but is not limited to, a drone having an image sensor.

Accordingly, the method and system for generating the suggested optimal time for performing the agricultural operation incorporate crowdsourcing data into the determination of when the most optimal time to perform the operation is. By including the crowdsourcing data, the process described herein uses real-time data or activities taking place around the field-of-interest that may be helpful to determine when the best time to perform a given operation is. For example, if crowdsourcing date related to one or more fields adjacent and/or surrounding the field-of-interest indicate that crop is currently being harvested, and the model predicts the best time to harvest crop in the field-of-interest is in two days, then the time estimator algorithm may consider the activities occurring in the fields adjacent to the field-of-interest and modify or adjust the predicted optimal time and suggest that the optimal time to harvest the crop in the field-of-interest is tomorrow.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
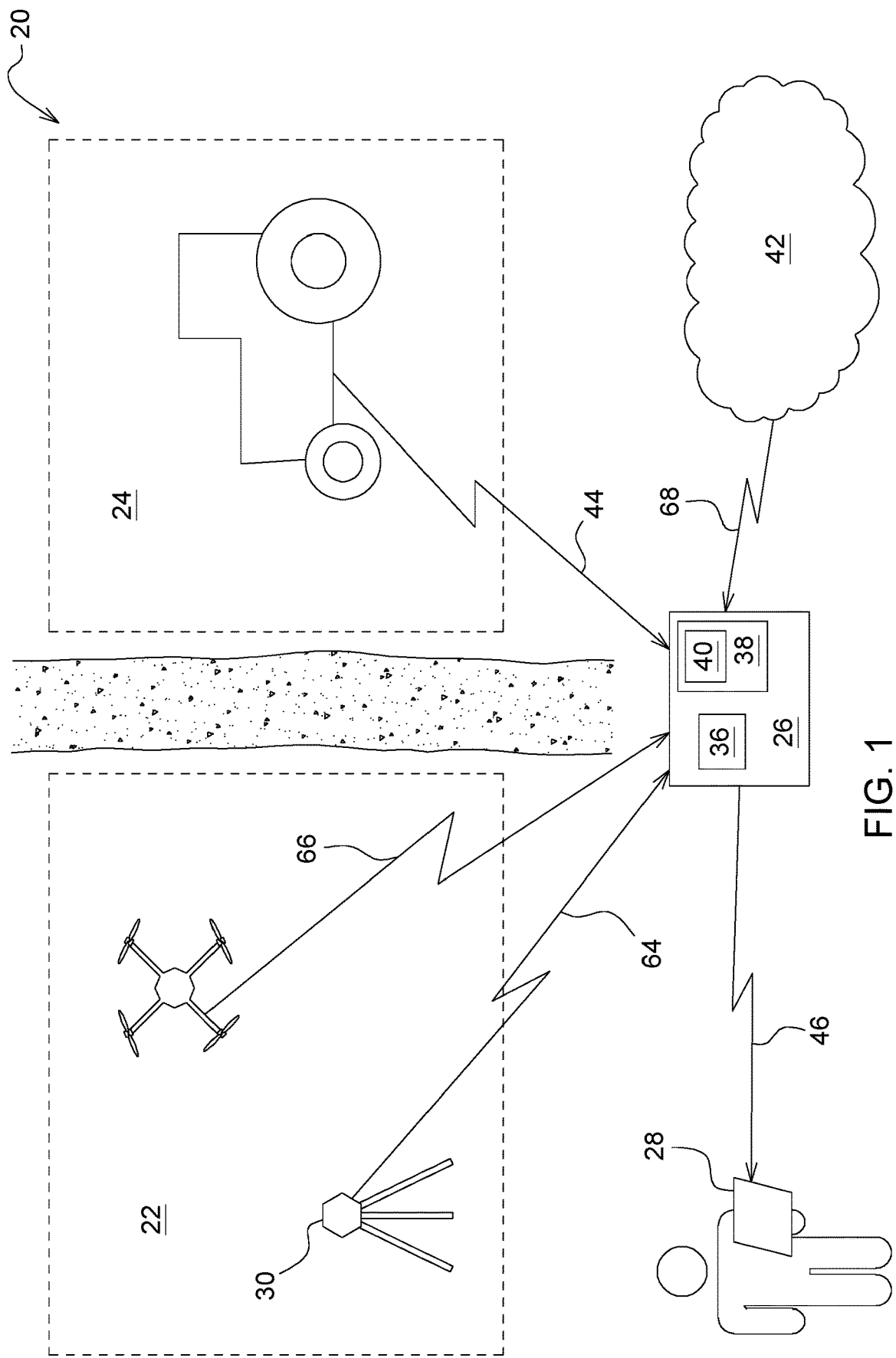
FIG. 1 is a schematic perspective view of a system for suggesting an optimal time for performing an agricultural operation.

Referring to the Figures, wherein like numerals indicate like parts throughout the several views, a system is generally shown at 20 in FIG. 1. The system 20 is operable to generate a suggested optimal time 46 for performing an agricultural operation in a field. The agricultural operation may include, but is not limited to, one of mowing a crop in the field, raking the crop in the field, baling the crop in the field, spraying the crop in the field, fertilizing the crop in the field, irrigating the crop in the field, or applying a pesticide to the crop in the field.

While the teachings of this disclosure may be applied to any field, the detailed description describes the system 20 and process for generating the suggested optimal time 46 for a specific field, herein after referred to as the field-of-interest 22, and which is surrounded by other fields, hereinafter referred to as adjacent fields 24.

Referring to FIG. 1, the system 20 includes a computing device 26 and a communicator 28, each of which are described in greater detail below. The system 20 may further include at least one sensor 30 that is positioned within or around the field-of-interest 22. Each sensor 30 may include one or more individual sensing components, each designed to sense a specific factor. As such, each sensor 30 may include a single sensing component that is configured to sense a single factor, or may include multiple sensing components that are configured to sense multiple factors. The field-of-interest 22 may include a single sensor 30, or may include multiple sensors 30 positioned around and/or throughout the field-of-interest 22. The sensors 30 may be configured to sense, but are not limited to, any relevant environmental and/or crop related factor. For example, the different factors that the sensors 30 may be configured to sense may include, but are not limited to, a current air temperature in the field-of-interest 22, a current soil moisture content in the field-of-interest 22, a current humidity in the field-of-interest 22, a current wind speed in the field-of-interest 22, or a current barometric pressure in the field interest.

The sensors 30 may be powered by a battery and include a solar charging system for charging the battery. Alternatively, the sensors 30 may be connected to a hardwired power source. The sensors 30 are disposed in communication with the computing device 26. For example, the sensors 30 may be connected wirelessly with the computing device 26 via a wireless internet connection to transmit data therebetween. Alternatively, the sensors 30 may be connected to the computing device 26 via a wired internet connection to transmit data therebetween. Various types of remote field sensors 30 are known to those skilled in the art that are suitable for use in accordance with this disclosure. As such, the sensors 30 are not described in greater detail herein.

The communicator 28 is disposed in communication with the computing device 26 and is operable to convey the suggested optimal time 46 from the computing device 26 to a user. The communicator 28 may include, but is not limited to, a portable handheld device having a display or screen. The portable handheld device may include, but is not limited to, a mobile smart phone or tablet device. Alternatively, they communicator 28 may include a laptop or desktop computer. It should be appreciated that the communicator 28 may include any device capable of communicating a message to the user. The specific type and/or operation of the communicator 28 is not pertinent to the teachings of this disclosure, are well known to those skilled in the art, and are therefore not described in detail herein.

The computing device 26 is disposed in communication with the communicator 28 and the sensors 30. The computing device 26 may be connected for communication with the communicator 28 and the sensors 30 in any suitable manner. For example, the computing device 26 may be wirelessly connected to the sensors 30 and the communicator 28 via a wireless internet or cellular connection. Alternatively, the computing device 26 may be connected to the sensors 30 and the communicator 28 via a hard wired internet connection, or a combination of a wireless network and hardwired internet connection. The computing device 26 is located remote from the field-of-interest 22 and remote from the communicator 28. In one embodiment, the computing device 26 includes one or more computers connected via the internet to define a Cloud Analytics Engine.

The computing device 26 may alternatively be referred to as a controller, a computer, a module, a control unit, a control module, etc. The computing device 26 is operable to generate a suggested optimal time 46 to perform an agricultural operation. The computing device 26 includes a processor 36, a memory 38, and all software, hardware, algorithms, connections, sensors 30, etc., necessary to generate the suggested optimal time 46 to perform the agricultural operation. As such, a method may be embodied as a program or algorithm operable on the computing device 26. It should be appreciated that the computing device 26 may include any device capable of analyzing data from various sensors 30, comparing data, and making the necessary decisions required to generate the suggested optimal time 46 to perform the agricultural operation.

The computing device 26 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 38 may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

As described above, the computing device 26 includes the tangible, non-transitory memory 38 on which is recorded computer-executable instructions, including a time estimator algorithm 40. The processor 36 of the computing device 26 is configured for executing the time estimator algorithm 40. The time estimator algorithm 40 implements a method of generating the suggested optimal time 46 for performing the agricultural operation.

Figure 2:
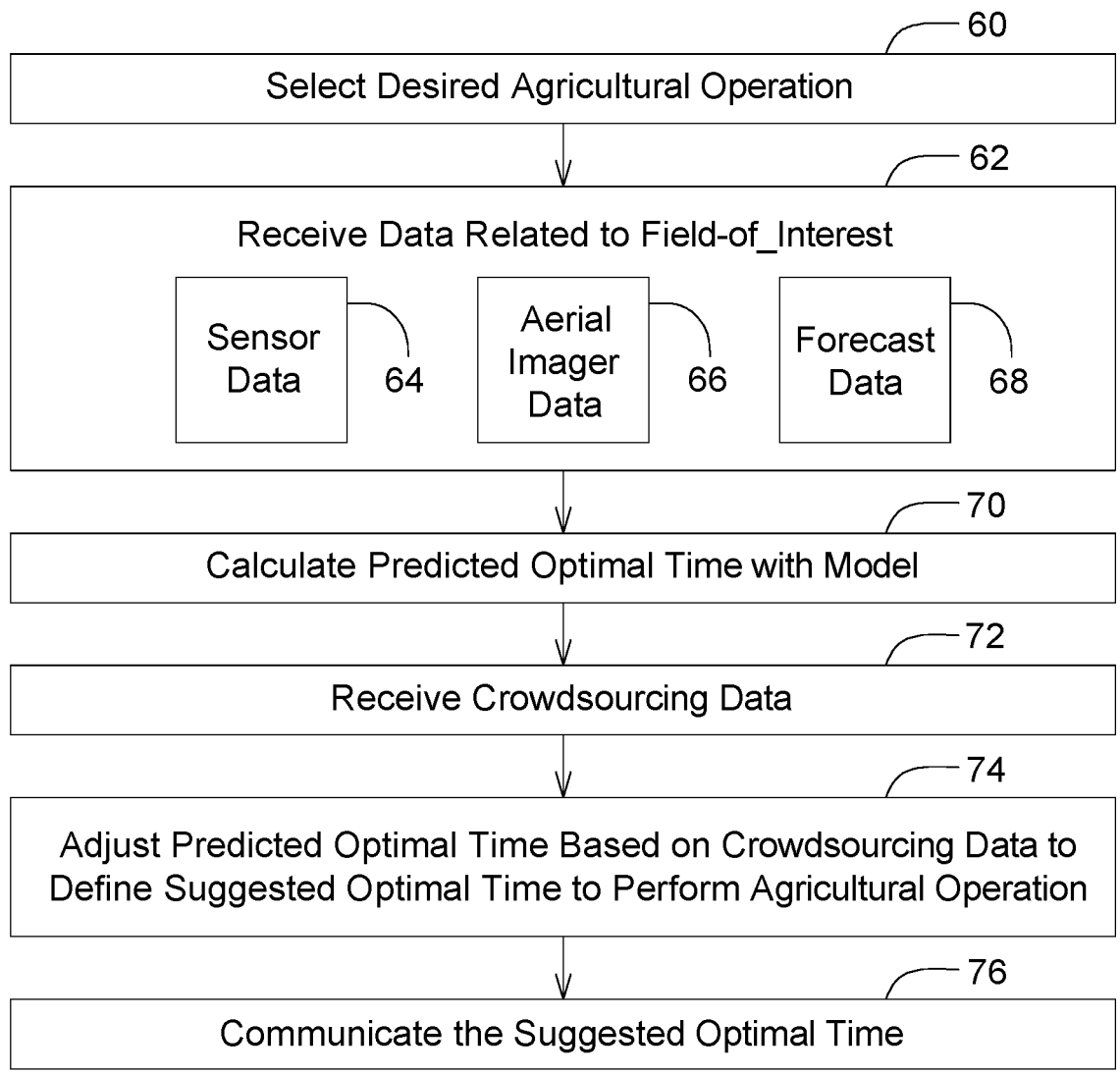
FIG. 2 is a flowchart representing a method of suggesting the optimal time for performing the agricultural operation.

Referring to FIG. 2, the method of generating the suggested optimal time 46 for performing the agricultural operation in the field-of-interest 22 includes inputting or selecting the desired agricultural operation. The step of selecting the desired agricultural operation is generally indicated by box 60 in FIG. 2. The desired agricultural operation may include, but is not limited to, one of mowing the crop in the field-of-interest 22, raking the crop in the field-of-interest 22, baling the crop in the field-of-interest 22, spraying the crop in the field-of-interest 22, fertilizing the crop in the field-of-interest 22, irrigating the crop in the field-of-interest 22, or applying a pesticide to the crop in the field-of-interest 22. The desired agricultural operation may be input into the time estimator algorithm 40 of the computing device 26 in a suitable manner. For example, the desired agricultural operation may be input by the user using the communicator 28 of the handheld device, e.g., of a smart phone or tablet. The handheld device may include an app operable thereon that connects to the time estimator algorithm 40 of the computing device 26, and allows the user to enter or input the desired agricultural operation.

Additionally, an equipment setting may also be input into the time estimator algorithm 40. The equipment setting is related to a setting or positioning of an implement that will be sued for executing the desired agricultural operation. For example, if the desired agricultural operation is defined to include mowing crop, then the equipment setting may include, but is not limited to, a type and size of a mower or mower-conditioner, a swathboard position, a swath or windrow width, a swath or windrow height, a crop conditioning setting, a tractor type and size, etc.

Data related to a current condition of the crop in the field-of-interest 22 is received with the time estimator algorithm 40 of the computing device 26. The step of receiving data related to the field-of interest 22 is generally indicated by box 62 in FIG. 2. The data related to the current condition of the crop may be received from any source. For example, sensor data 42 related to the current condition of the crop may be received from one or more of the sensors 30 disposed or located in the field-of-interest 22. Data received from the sensors 30 is generally indicated by box 64 in FIG. 2. As noted above, the data related to the current condition of the crop may include, but is not limited to, at least one of the current air temperature in the field-of-interest 22, a current soil moisture content in the field-of-interest 22, a current humidity in the field-of-interest 22, a current wind speed in the field-of-interest 22, or a current barometric pressure in the field-of-interest 22. It should be appreciated that the specific type of data related to the current condition of the crop may depend upon the desired agricultural operation. As such, certain operations may require a defined set of data type inputs, whereas a different operation may require a different set of data type inputs.

Additionally, the data related to the current condition of the crop in the field-of-interest 22 may be received by the time estimator algorithm 40 of the computing device 26 from an aerial imager 32. Data from the aerial imager 32 is generally indicated by box 66 in FIG. 2. The Aerial imager 32 may include, but is not limited to, a drone having an image sensor mounted thereto. The data may include, but is not limited to, and overhead image of the crop in the field-of-interest 22.

Data related to a forecast for the field-of-interest 22 may also be received by the time estimator algorithm 40 of the computing device 26. The forecast data is generally indicated by box 68 in FIG. 2. The data related to the forecast for the field-of-interest 22 may be received by the time estimator algorithm 40 of the computing device 26 from one or more websites 42 via an internet connection. The forecast data 68 related to the forecast for the field-of-interest 22 may include, but is not limited to, at least one of a weather forecast for the field-of-interest 22 for a predefined future time period, a solar forecast for the field-of-interest 22 for the predefined future time period, a wind forecast for the field-of-interest 22 for the predefined future time period, a humidity forecast for the field-of-interest 22 for the predefined future time period, or a precipitation forecast for the field-of-interest 22 for the predefined future time period. The predefined future time period may include any duration of time suitable for the particular desired agricultural operation. For example, the predefined future time period may include, but is not limited to, a 24 hour period, a 48 hour period, a 72 hour period, a one week period, a two week period, etc.

The time estimator algorithm 40 of the computing device 26 may then calculate a predicted optimal time to perform the agricultural operation in the field-of-interest 22, using an agricultural model. The step of calculating the predicted optimal time with the model is generally indicated by box 70 in FIG. 2. The agricultural model calculates the predicted optimal time using the data related to the current condition of the crop in the field-of-interest 22, and any equipment settings as inputs. The model may further use the data related to the forecast for the field-of-interest 22 in order to calculate the predicted optimal time. The agricultural model correlates the various inputs for the current condition of the crop in the field-of-interest 22 and the weather forecasts to a predicted optimal time for performing the desired agricultural operation based on prior previously recorded data. For example, previous data may indicate that hay cut having a certain moisture content will require a certain amount of time to dry to a desired moisture content for the current air temperature and humidity levels. The model may use this relationship to predict the optimal time to bale the hay.

The time estimator algorithm 40 of the computing device 26 further receives crowdsourcing data 44. The step of receiving the crowdsourcing data is generally indicated by box 72 in FIG. 2. The crowdsourcing data is related to agricultural operations occurring within a defined area surrounding the field-of-interest 22 and within a defined preceding time period. For example, the crowdsourcing data may be related to agricultural activities and/or operations in adjacent fields 24. As used herein, the term "crowdsourcing" is defined as obtaining information from one or more people who submit their data via the internet, social media, or a smartphone or computer application.

The crowdsourcing data related to the agricultural operations within the defined area surrounding the field-of-interest 22 and within the defined preceding time period, i.e., adjacent fields 24, may include but is not limited to data related to at least one of a crop baling operation occurring within the defined area, a crop mowing operation occurring within the defined area, a crop raking operation occurring within the defined area, a crop spraying operation occurring within the defined area, a crop fertilizing operation occurring within the defined area, a crop pesticide application occurring within the defined area, a crop irrigation operation occurring within the defined area, an equipment moving operation occurring within the defined area, equipment type, size, and/or equipment settings for implements used within the predefined area, or traffic data on roadways within the predefined area.

Upon receiving the crowdsourcing data, the time estimator algorithm 40 of the computing device 26 may then adjust or modify the predicted optimal time to perform the agricultural operation calculated by the agricultural model, to generate the suggested optimal time 46 to perform the agricultural operation. The step of adjusting the predicted optimal time to define the suggested optimal time 46 is generally indicated by box 74 in FIG. 2. By using the crowdsourcing data from the adjacent fields 24, the time estimator algorithm 40 may take into account and/or consider the activities that other similarly situated users are currently performing in that region. For example, if a user selects hay crop mowing as the desired agricultural operation, and the crowdsourcing data indicates that several other users are currently mowing hay in the adjacent fields 24 near the field-of-interest 22, then the time estimator algorithm 40 may consider that current activities of others similarly situated, and may adjust the predicted optimal time to perform the agricultural operation, e.g., mowing hay, based on the crowdsourcing data indicating that several other similarly situated users are mowing hay in adjacent fields 24, thereby providing improving the accuracy of and/or confidence in the suggested optimal time 46 to perform the desired agricultural operation.

Once the time estimator algorithm 40 has generated the suggested optimal time 46 to perform the desired agricultural operation, then the time estimator algorithm 40 of the computing device 26 may communicate the suggested optimal time 46 to the communicator 28. The step of communicating the suggested optimal time 46 is generally indicated by box 76 in FIG. 2. The communicator 28 may then present or convey the suggested optimal time 46 to the user.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of generating suggested optimal times for performing agricultural operations in a field, the method comprising:
   providing a computing device at a location remote from the field, the computing device including a processor and a memory having a time estimator algorithm stored thereon, wherein the processor is operable to execute the time estimator algorithm;

receiving data at the time estimator algorithm of the computing device from at least one sensor located in the field, wherein the data indicates a current condition of a crop in the field acquired by the at least one sensor located in the field;

receiving, at the computing device, an input from a user indicating a desired agricultural operation;

determining, by the time estimator algorithm of the computing device using an agricultural model, a predicted optimal time to perform the desired agricultural operation in the field, wherein the agricultural model determines the predicted optimal time using the data related to the current condition of the crop as an input;

receiving crowdsourcing data with the time estimator algorithm of the computing device, wherein the crowdsourcing data is related to agricultural operations occurring within a defined area surrounding the field and within a defined preceding time period;

adjusting the predicted optimal time to perform the desired agricultural operation based on the crowdsourcing data to generate a suggested optimal time to perform the desired agricultural operation;

communicating the suggested optimal time to a communicator located remote from the computing device;

displaying the suggested optimal time on the communicator; and executing the desired agricultural operation with an implement based on a command including the suggested optimal time.

2. The method set forth in claim 1, wherein the desired agricultural operation includes one of mowing the crop, raking the crop, baling the crop, spraying the crop, fertilizing the crop, irrigating the crop, or applying a pesticide to the crop.

3. The method set forth in claim 1, wherein the data from the at least one sensor includes data related to at least one of a current air temperature in the field, a current soil moisture content in the field, a current humidity in the field, a current wind speed in the field, or a current barometric pressure in the field.

4. The method set forth in claim 1, further comprising receiving data with the time estimator algorithm of the computing device, wherein the data is related to a forecast for the field.

5. The method set forth in claim 4, wherein receiving the data related to the forecast for the field includes receiving data from at least one website via an internet connection.

6. The method set forth in claim 4, wherein the data related to the forecast for the field includes data related to at least one of a weather forecast for the field for a predefined future time period, a solar forecast for the field for the predefined future time period, a wind forecast for the field for the predefined future time period, a humidity forecast for the field for the predefined future time period, or a precipitation forecast for the field for the predefined future time period.

7. The method set forth in claim 1, wherein the crowdsourcing data related to the agricultural operations within the defined area surrounding the field and within the defined preceding time period includes data related to at least one of a crop baling operation occurring within the defined area, a crop mowing operation occurring within the defined area, a crop raking operation occurring within the defined area, a crop spraying operation occurring within the defined area, a crop fertilizing operation occurring within the defined area, a crop pesticide application occurring within the defined area, a crop irrigation operation occurring within the defined area, an equipment type, an equipment size, an equipment setting, an equipment moving operation occurring within the defined area, or traffic data on roadways within the predefined area.

8. The method set forth in claim 1, wherein receiving data related to the current condition of the crop in the field includes receiving data from an aerial imager, wherein the data from the aerial imager includes an overhead image of the crop in the field.

9. The method set forth in claim 1, wherein the communicator includes a portable handheld device.

10. The method set forth in claim 1, further comprising inputting an equipment setting into the time estimator algorithm of the computing device, wherein the equipment setting is related to a setting of an implement for executing the desired agricultural operation.

11. A system for generating suggested optimal times for performing agricultural operations in a field, the system comprising:

a communicator operable to convey a suggested optimal time for a desired agricultural operation;

at least one sensor positioned in the field and configured to acquire data indicating a current condition of a crop in the field;

a computing device disposed in communication with the communicator and located remote from the field and the communicator, the computing device including a processor and a memory having a time estimator algorithm stored thereon, wherein the processor is operable to execute the time estimator algorithm to:

receive data indicating the current condition of the crop in the field from the at least one sensor positioned in the field;

receive an input from a user indicating the desired agricultural operation;

determine, based on an agricultural model and the data received from the at least one sensor positioned in the field, a predicted optimal time to perform the desired agricultural operation in the field;

receive crowdsourcing data related to agricultural operations occurring within a defined area surrounding the field and within a defined preceding time period;

adjust the predicted optimal time to perform the desired agricultural operation based on the received crowdsourcing data to generate the suggested optimal time to perform the desired agricultural operation; and communicate the suggested optimal time to the communicator; and an implement configured to execute the desired agricultural operation based on the suggested optimal time.

12. The system set forth in claim 11, wherein the desired agricultural operation includes one of mowing the crop, raking the crop, baling the crop, spraying the crop, fertilizing the crop, irrigating the crop, or applying a pesticide to the crop.

13. The system set forth in claim 11, wherein the data from the at least one sensor includes data related to at least one of a current air temperature in the field, a current soil moisture content in the field, a current humidity in the field, a current wind speed in the field, or a current barometric pressure in the field.

14. The system set forth in claim 11, wherein the processor is operable to execute the time estimator algorithm to receive data from at least one website via an internet connection.

15. The system set forth in claim 14, wherein the data from the at least one website includes data related to at least one of a weather forecast for the field for a predefined future time period, a solar forecast for the field for the predefined future time period, a wind forecast for the field for the predefined future time period, a humidity forecast for the field for the predefined future time period, or a precipitation forecast for the field for the predefined future time period.

16. The system set forth in claim 11, wherein the crowd-sourcing data related to the agricultural operations within the defined area surrounding the field and within the defined preceding time period include data related to at least one of a crop baling operation occurring within the defined area, a crop mowing operation occurring within the defined area, a crop raking operation occurring within the defined area, a crop spraying operation occurring within the defined area, a crop fertilizing operation occurring within the defined area, a crop pesticide application occurring within the defined area, a crop irrigation operation occurring within the defined area, an equipment moving operation occurring within the defined area, or traffic data on roadways within the predefined area.

17. The system set forth in claim 11, wherein the processor is operable to execute the time estimator algorithm to receive data from an aerial imager.

18. The system set forth in claim 17, wherein the data from the aerial imager includes an overhead image of the crop in the field.

* * * * *